(No Model.) 8 Sheets—Sheet 2
J. B. G. A. CANET.
RECOIL ACTUATED HYDRAULIC BREECH OPERATING MECHANISM FOR ORDNANCE.
No. 531,157. Patented Dec. 18, 1894.
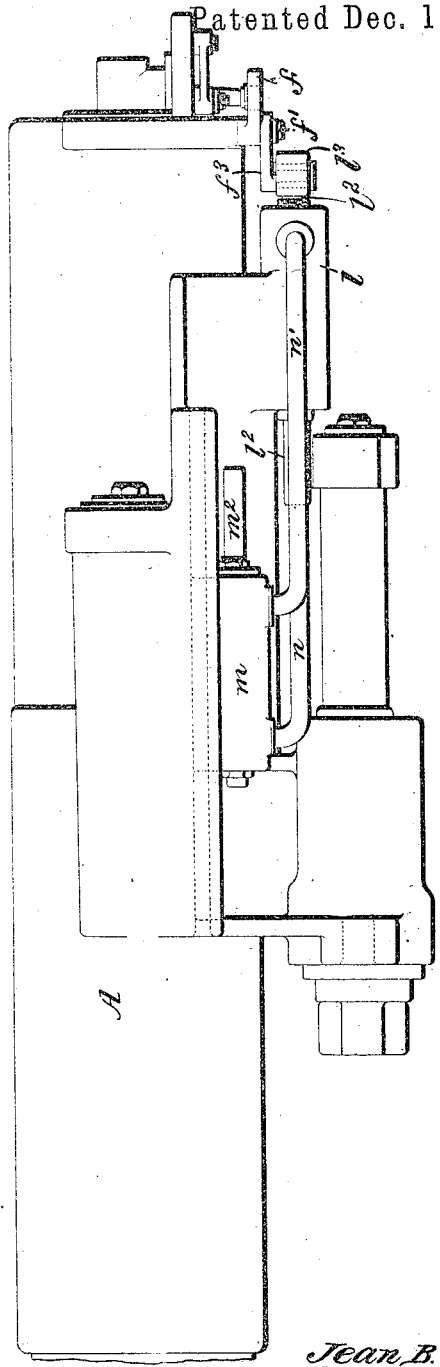
Fig.1.A
Witnesses.
Thos. A. Green
Robt. Burnett
Inventor.
Jean B. G. A. Canet.
By James L. Norris
Atty.

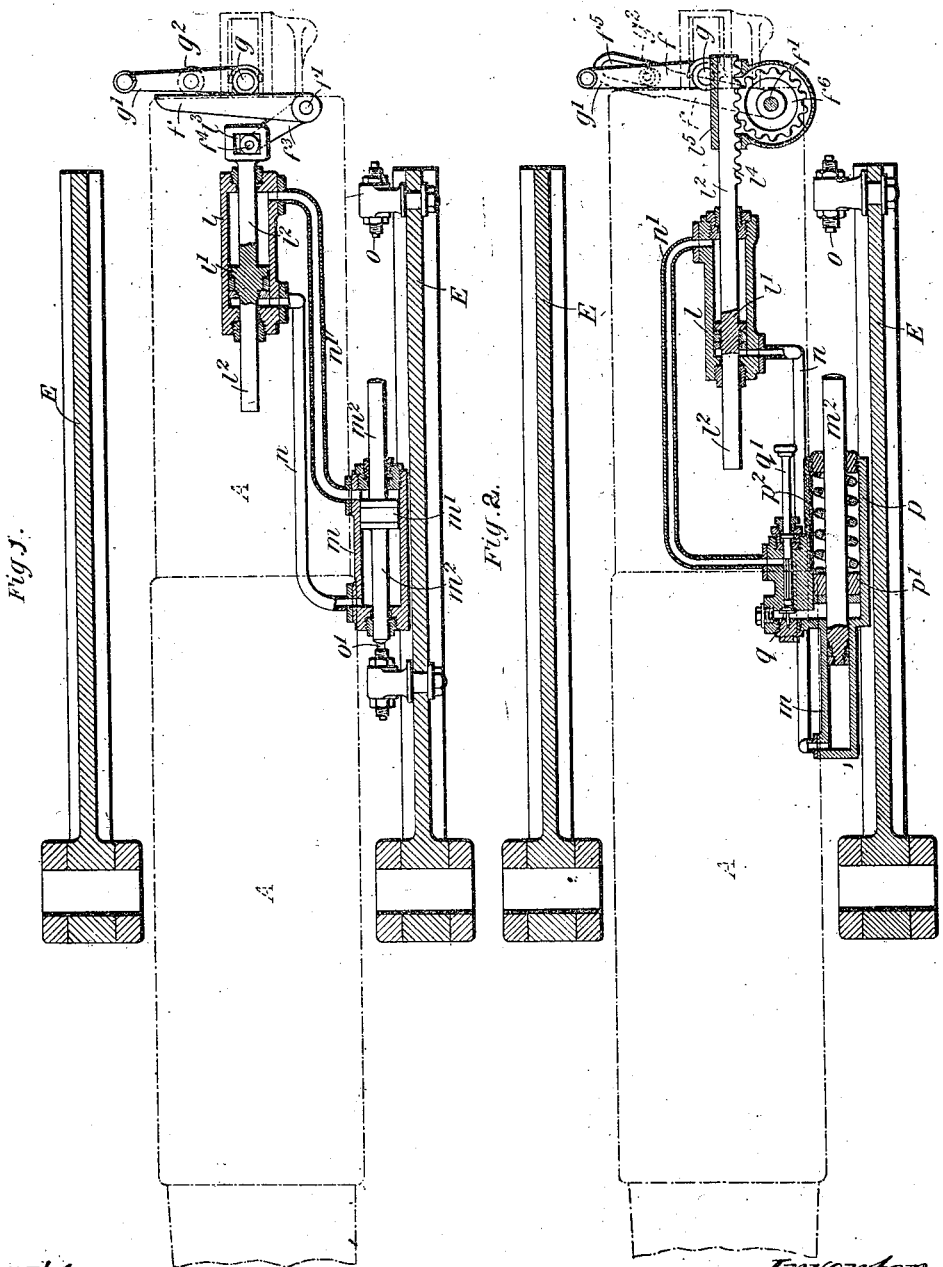

(No Model.)
8 Sheets—Sheet 3.
J. B. G. A. CANET.
RECOIL ACTUATED HYDRAULIC BREECH OPERATING MECHANISM FOR ORDNANCE.
No. 531,157.
Patented Dec. 18, 1894.
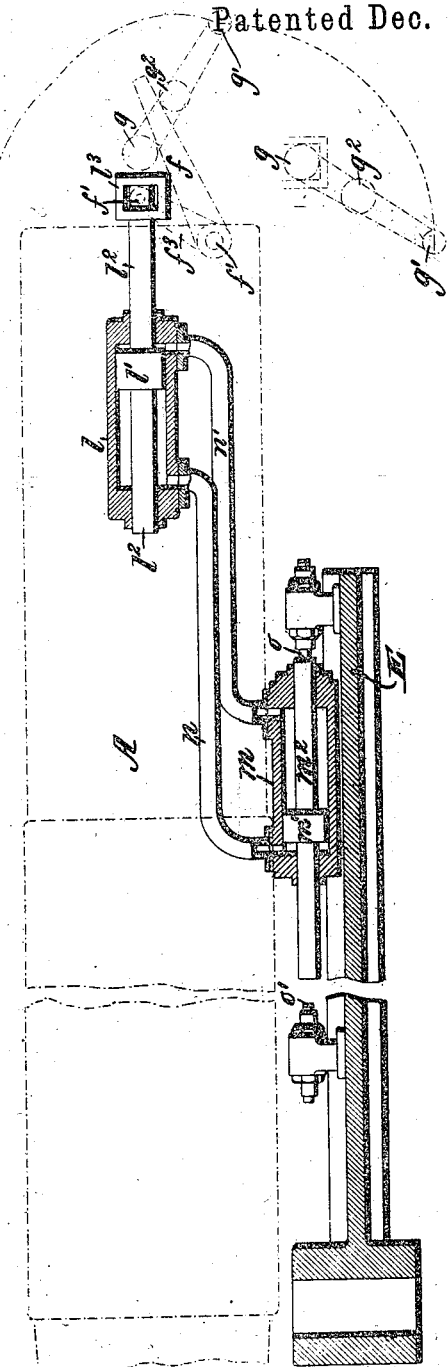
Fig. 1ᴮ
Witnesses.
Inventor
Jean B. G. A. Canet.

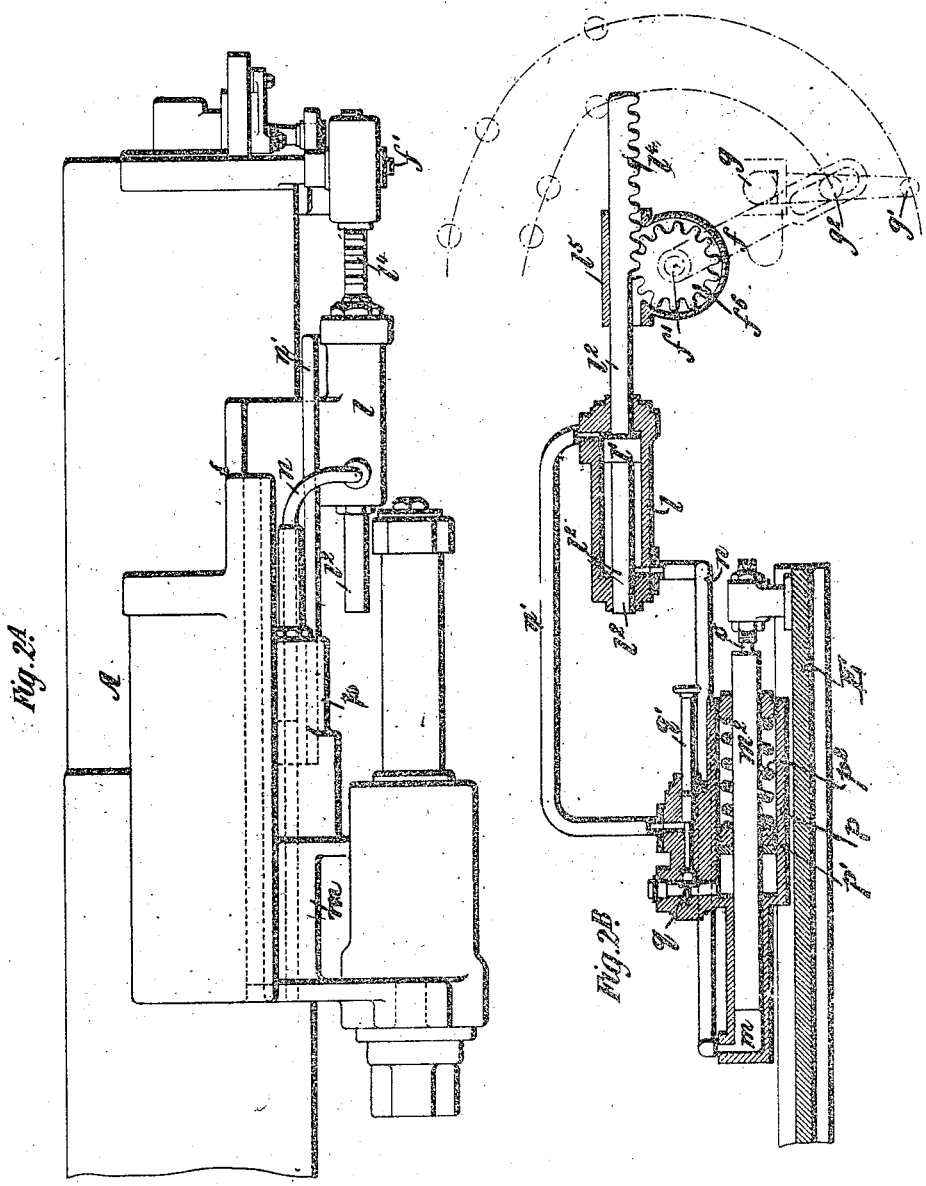

(No Model.) 8 Sheets—Sheet 5.
J. B. G. A. CANET.
RECOIL ACTUATED HYDRAULIC BREECH OPERATING MECHANISM FOR ORDNANCE.
No. 531,157. Patented Dec. 18, 1894.
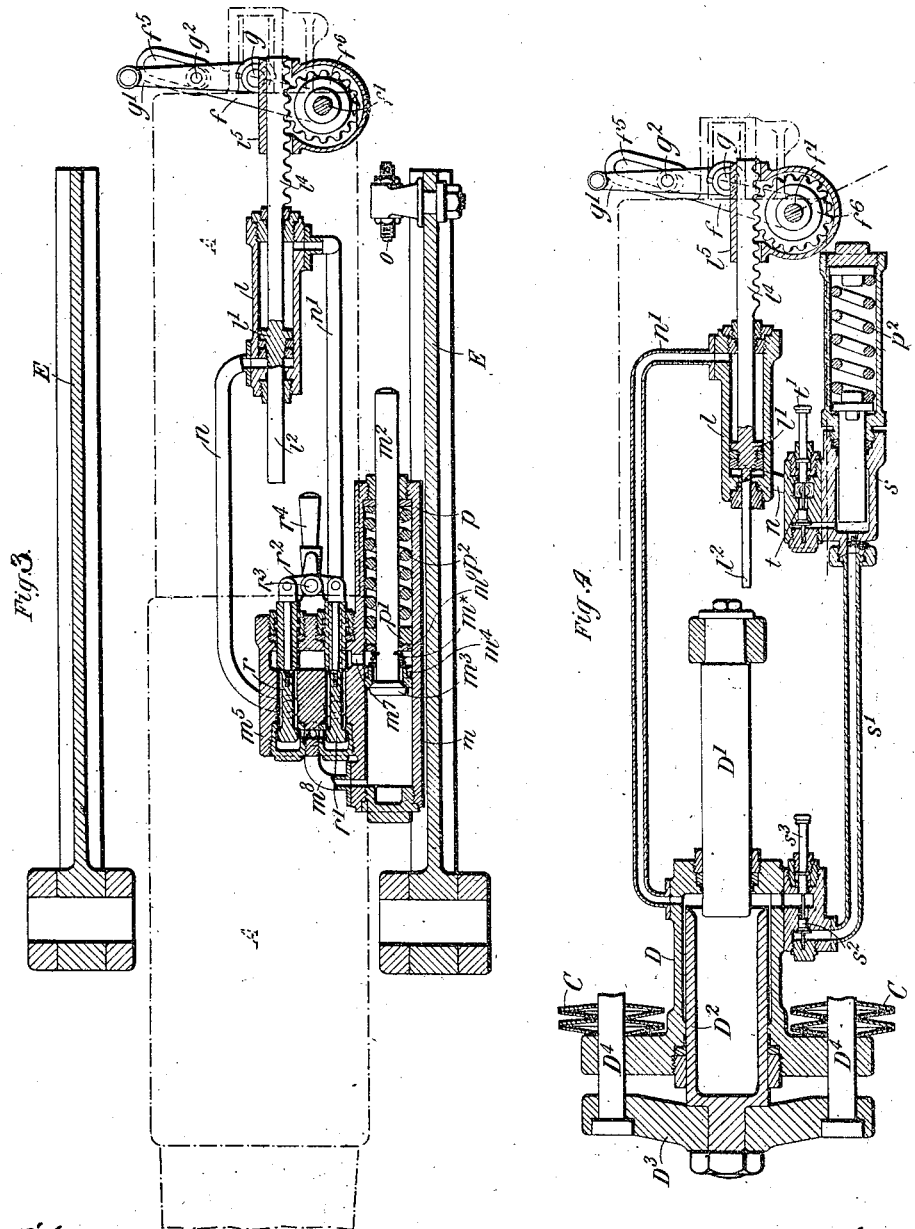
Witnesses:
Wm. H. Gaskin
Robert Everitt
Inventor:
Jean B. G. A. Canet.
By James L. Norris
Atty.

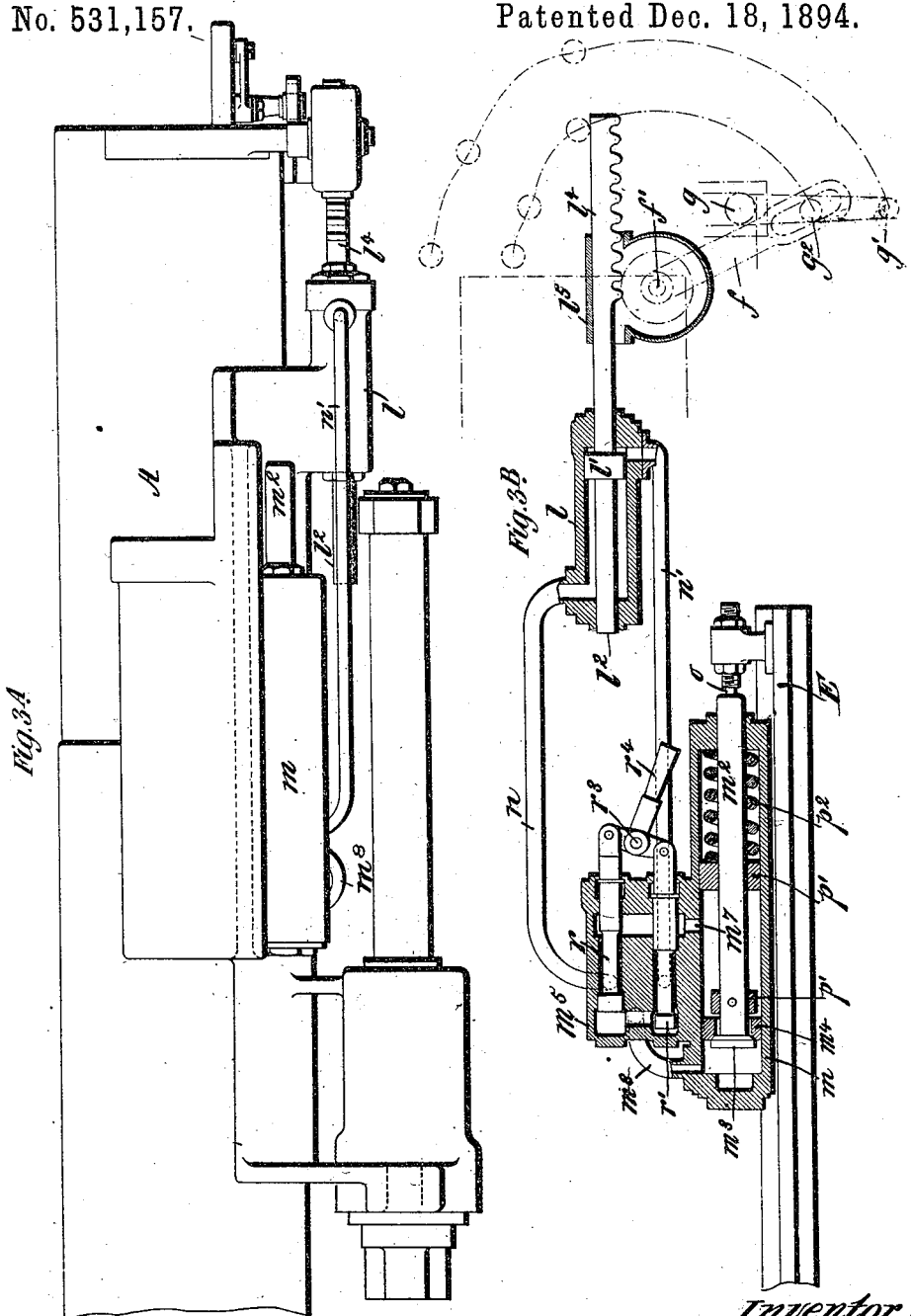

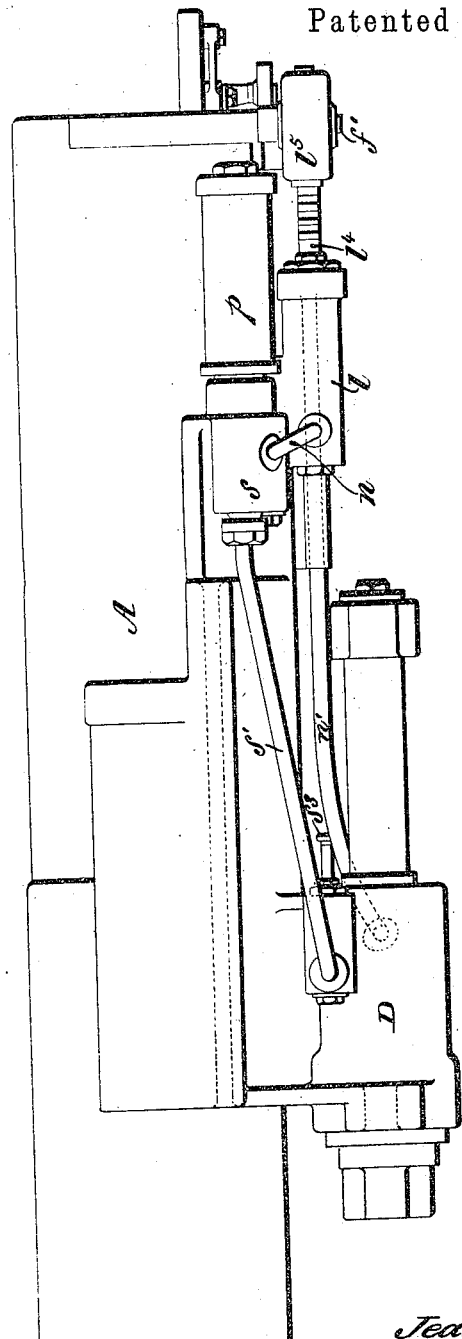

(No Model.) 8 Sheets—Sheet 8.
J. B. G. A. CANET.
RECOIL ACTUATED HYDRAULIC BREECH OPERATING MECHANISM FOR ORDNANCE.
No. 531,157. Patented Dec. 18, 1894.
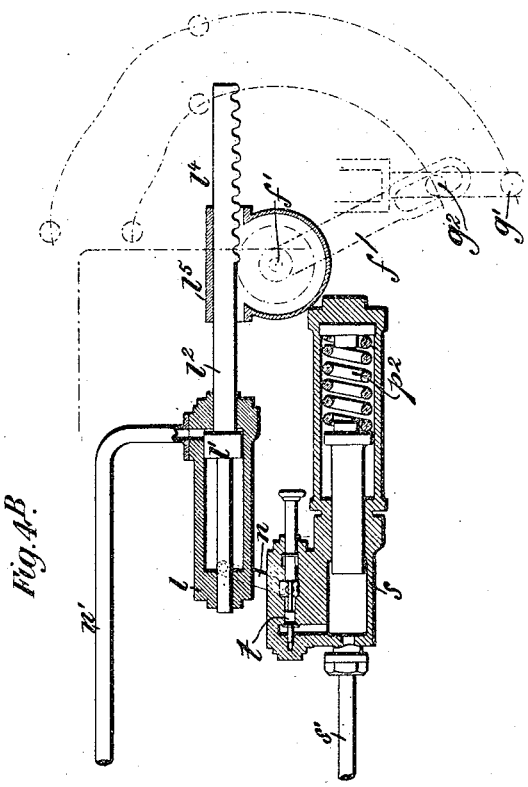
Fig. 4.B.
Witnesses.
Thos. A. Green
Robert Everett
Inventor.
Jean B. G. A. Canet.
By James L. Norris.
Atty.

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, LIMITED, OF MANCHESTER, ENGLAND.

RECOIL-ACTUATED HYDRAULIC BREECH-OPERATING MECHANISM FOR ORDNANCE.

SPECIFICATION forming part of Letters Patent No. 531,157, dated December 18, 1894.

Application filed November 17, 1892. Serial No. 452,344. (No model.) Patented in England June 8, 1889, No. 285, and in France June 8, 1889, No. 198,814.

*To all whom it may concern:*

Be it known that I, JEAN BAPTISTE GUSTAVE ADOLPHE CANET, engineer, a citizen of the Republic of France, and a resident of Paris, France, have invented certain new and useful Improvements in the Breech Mechanism of Guns, (for which I have obtained patents in the following countries, viz: Great Britain, No. 285, of January 7, 1890, but dated under the International Convention as of June 8, 1889, and France, No. 198,814, dated June 8, 1889,) of which invention the following is a specification, reference being had to the accompanying drawings.

This invention has for its object the provision of improved means for automatically opening the breech of a quick-firing gun by the recoil or running out movements of the gun or for storing up energy derived from the recoil and subsequently utilizing this energy for opening and closing the breech.

The said invention is applicable to those guns, wherein the breech is opened by one movement of a single operating lever such for example as that described in prior United States Patent No. 447,228.

In the accompanying drawings which illustrate this invention: Figure 1, shows partly in section and partly in plan view one form of my improved hydraulic arrangements for opening the breech. Fig. 1$^A$ is a side elevation thereof, and Fig. 1$^B$ a detail sectional view of the operative parts, shown in recoil position. Fig. 2 is a similar view to Fig. 1 of a hydraulic device for both opening and closing the breech. Fig. 2$^A$ is a side elevation thereof, and Fig. 2$^B$ a detail section of the operative parts shown in the recoil position. Figs. 3 and 4 show other modifications of my hydraulic devices which store energy during the recoil to be subsequently used for the purposes of opening and closing the breech. Figs. 3$^A$ and 3$^B$ are respectively a side elevation of the mechanism shown in Fig. 3 and a detail sectional view of the operative part shown in the recoil position. Figs. 4$^A$ and 4$^B$ are respectively a side elevation of the parts shown in Fig. 4 and a detail sectional view of the operative parts shown in the recoil position.

Like letters of reference indicate corresponding parts in all the drawings.

The hydraulic arrangement shown in Figs. 1, 1$^A$ and 1$^B$ effects the opening of the breech at the end of the recoil, and allows the breech to be closed by hand at the end of the running out. $l$ is a hydraulic cylinder fixed to the gun A and having a piston $l'$ which has a rod $l^2$ projecting on both sides thereof through packed glands in the cylinder ends. $l^3$ is a rectangular slot formed in the rectangular head at the rear end of the piston rod $l^2$. Within the said slot works a bearing block carried by a pin $f^4$ of the short arm $f^3$ of the lever $f$. $m$ is another hydraulic cylinder fixed to the gun cradle and which is provided with a piston $m'$ and a piston rod $m^2$ that projects through both ends of the cylinder. $n$, $n'$ are pipes connecting respectively the front and the rear ends of the two cylinders $l\,m$. $o\,o'$ are adjustable stops in line with the piston rod $m^2$. The said stops are attached to the chassis or other non-recoiling part E of the gun carriage. When the gun recoils the rear end of the rod $m^2$ is arrested by the stop $o$ just before the completion of the recoil and the piston $m'$ is thereby forced to the forward end of the cylinder thus driving out the liquid in front of it and forcing the same through the pipe $n$ into the cylinder $l$ where it operates to drive back the piston $l'$ and so through the lever $f$ opens the breech. While the breech is being opened, the liquid in rear of the piston $l'$ is driven out of the cylinder $l$ through the pipe $n'$ into the cylinder $m$. Upon the running out of the gun after recoil, the rod $m^2$ is arrested by the stop $o'$ and the liquid in rear of the piston $m'$ is thus driven back into the cylinder $l'$ and operates to return the lever $f$ to its initial position. The breech can then be closed by hand.

In the modification shown in Figs. 2, 2$^A$ and 2$^B$ I provide for opening the breech automatically at the end of the recoil and closing it when desired upon the movement by hand of a valve, the force for closing the breech being derived from the recoil. Two cylinders $m$, $l$ are employed as before. The arrangement of the cylinder $l$ is similar to that last described, but in this case I have substituted a rack $l^4$ formed on the rod $l^2$ and sliding in a guide $l^5$ and gearing with a toothed pinion $f^6$ secured on the pivot pin $f'$ of the lever $f$, in lieu of the pin and slot connection shown in Fig. 1. The cylinder $m$ which is attached to the cradle is provided with a simple plunger $m^2$ that fits the cylinder and projects from the rear end thereof through a spring accumulator $p$ which is formed with or fixed to the end of the cylinder $m$. $p'$ is a piston which fits in the cylinder $p$ and is acted upon by a spring $p^2$. $q$ is a non-return valve adapted to close the admission opening of the cylinder $p$. $q'$ is the spindle of the said valve which projects through the casing. The pipe $n'$ leads into the valve box in front of the valve $q$. In this case the lever $f$ is provided with a slot which embraces the roller $g^2$ of the breech lever $g'$ so that the said lever $f$ is capable of moving the breech-lever in both directions. When the gun recoils, the plunger $m^2$ is arrested by the stop $o$ as in the arrangement previously described and drives out the liquid from the cylinder $m$ into the cylinder $l$ and opens the breech. The liquid displaced from the rear end of the cylinder $l$ raises the valve $q$ and enters the accumulator cylinder $p$ and compresses the spring $p^2$ therein. This liquid cannot return to the cylinder $l$ until the valve $q$ is opened by pressing the spindle $q'$. Consequently the breech remains open as long as the gunner desires. It is closed by pressing the spindle $q'$ which act allows the liquid in the accumulator to return to the cylinder $l$ under the pressure of the accumulator spring $p^2$ thereby forcing forward the piston $l'$ and returning the lever $f$ to its initial position. Sufficient initial pressure is always maintained in the accumulator cylinder $p$ to keep the breech closed.

In the arrangement shown in Figs. 3, 3$^A$ and 3$^B$ I have provided for opening and closing the breech by force derived from the recoil, such opening and closing being effected at a time determined by the gunner who for this purpose is required to operate a distributing valve. This arrangement comprises an operating cylinder $l$ and breech mechanism constructed the same as that in the last previously described modification, and another cylinder $m$ and spring accumulator in which the energy for working the breech-block is stored. The plunger $m^2$ of the cylinder $m$ is formed with a valve $m^3$ at the inner end which valve normally closes the aperture in a sliding piston seat $m^4$ provided in the cylinder. $m^*$ is a spring bearing against the rear face of the movable piston seat and a collar or other stop $m^0$ formed on the plunger $m^2$. The said spring acts to press the piston seat against the valve. $m^5$ is a valve box attached to the cylinder. The said valve box is fitted with two piston valves $r$ $r'$, which are connected together by a cross link $r^2$, which is pivoted at $r^3$ to the valve casing. $r^4$ is a handle by which the link $r^2$ can be oscillated and the valves $r$, $r'$ moved in and out. The said piston valves are reduced in diameter at their central portions thereby forming annular chambers between the valves and their casings, with which chambers the pipes $n$, $n'$ from the cylinder $l$ respectively communicate. The rear or feed end of the valve chamber communicates with the cylinder $m$ through a channel $m^7$ at a point in rear of the piston valve $m^4$, while the forward or exhaust end of the valve chamber communicates with the forward end of the cylinder $m$ through an exhaust pipe $m^8$ when the handle $r^4$ is in the central position so the valves are closed. When the gun recoils, the plunger $m^2$ is driven into the cylinder by the stop $o$ thereby displacing some of the liquid which displaced liquid passes between the valve $m^3$ and its seat $m^4$ and forces back the piston $p'$ thereby compressing the accumulator spring $p^2$. At the end of the recoil, the valve seat $m^4$ is forced against the valve $m^3$ by the spring $m^*$ and thereby closes the valve opening. The liquid is thus prevented from returning to the front end of the cylinder $m$. Consequently the accumulator spring is maintained in compression. If now the handle $r^4$ is turned down from its central position the liquid under pressure is allowed to pass through the admission opening of the valve $r$ and the pipe $n$ and act on the front of the piston $l'$ thus opening the breech, the exhaust liquid from the rear end of the cylinder $l$ passing through the pipe $n'$, the exhaust opening of the valve $r'$, and the pipe $m^8$ to the front end of the cylinder $m$. Upon subsequently raising the handle $r^4$ so as to close the valve $r$ to admission and open the valve $r'$ the liquid under pressure then acts the reverse way through the pipe $n'$ and closes the breech, the exhaust liquid from the front of the cylinder $l$ passing through the pipe $n$, the exhaust opening of the valve $r$ and the pipe $m^8$ to the front end of the cylinder $m$. The time of opening and closing the breech is thus determined by the movement of the handle $r^4$.

The modification shown in Figs. 4$^A$ and 4$^B$ has similar breech mechanism and operating cylinder as the two last previously described arrangements, and the gun is provided with recuperator apparatus which comprises a cylinder D formed with or attached to the gun cradle, a plunger D$'$ fixed at one end to the carriage and passing through a packed gland in the rear end of the cylinder D, and a movable tubular piston D$^2$ which works through a packed gland in the forward end of the cylinder D and is attached to a cross-head D$^3$ which is fixed to the tension rods D$^4$, D$_7$ of the recuperator springs C. This recuperator device forms no part of the present invention, but is described and claimed in Letters Patent granted to me May 16, 1893, and numbered 497,704. $s$ is a hydraulic accumulator for storing energy in the recoil. $s'$ is a pipe communicating with the said accumulator and the cylinder D, and provided with a non-return valve $s^2$. $n$ is a pipe communicating with the accumulator and the forward end of the cylinder $l$. $t$ is a non-return valve opening into the accumulator and adapted to close the pipe $n$. In this case the part of the rod $l^2$ in rear of the piston $l'$ is of smaller diameter than the part in front of the said piston for the purpose hereinafter specified. $s^3$, $t'$ are stems of the valves $s^2$, $t$ respectively whereby the said valves may be opened from the outside.

This device operates as follows: Upon the recoil taking place, the increase of pressure in the cylinder D causes the valve $s^2$ to be raised, and a portion of the liquid escapes therethrough into the accumulator cylinder $s$ putting the spring $p^2$ under compression. This liquid cannot return to the cylinder D until the valve $s^2$ is opened from the outside. Consequently it remains in the accumulator under pressure. The gunner can now by opening the valve $t$ allow this liquid under pressure to act upon the piston $l'$ whereupon the said piston is forced back and the breech is opened the liquid in the rear of the piston $l'$ being forced into the cylinder D through the pipe $n'$. When it is desired to close the breech, the two valves $s^3$ $t$ are simultaneously opened whereupon the liquid pressure is equalized in the three cylinders D, $s$ and $l$ and their connections, and by reason of the greater piston area on the rear face of the piston $l'$ than on the front face thereof the said piston is forced forward again and the breech thereby closed.

What I claim is—

1. In a quick firing gun in which the breech is opened by the simple pull of a lever, the combination with the said lever, of a hydraulic cylinder secured to the gun and having its piston rod adapted to engage said lever, of a second hydraulic cylinder secured to a part of the gun mounting that recoils and provided with a piston, pipes connecting said cylinders and means for driving forward the piston of the second cylinder by the recoil of the gun whereby a liquid contained therein is displaced and forced into the first cylinder and moves its piston to open the breech, substantially as described.

2. In a quick firing gun in which the breech is opened by the simple pull of a lever, the combination with the said lever, of a hydraulic cylinder secured to the gun and having its piston rod adapted to engage said lever, a second hydraulic cylinder secured to a part of the gun mounting that recoils and provided with a piston, pipes connecting said cylinders, a spring recuperator communicating with said second cylinder, a pipe connecting said first cylinder and recuperator, a valve controlling said communication, and means for driving forward the piston in said second cylinder by the recoil of the gun, substantially as described.

3. In a quick firing gun in which the breech is opened by the simple pull of a lever, the combination with said lever, of a hydraulic cylinder secured to the gun and having its piston rod adapted to engage said lever, a second hydraulic cylinder secured to a part of the gun mounting that recoils and provided with a piston, pipes connecting said cylinders, a stop fixed to a stationary part of the mounting and arranged in the path of the piston rod of the second cylinder, whereby the piston is driven forward upon the recoil of the gun and a liquid in said cylinder is displaced, a spring recuperator communicating with said second cylinder, a pipe connecting said first cylinder and recuperator, and a valve controlling said communication, substantially as described.

4. In a quick-firing gun in which the breech is operated by the simple pull of a lever, the combination with the said lever, of a lever $f$ pivoted on the hinge of the breech-block carrier bracket, a pinion $f^6$ fixed on the pivot of the lever $f$, a hydraulic cylinder $l$ fixed to the gun, the piston rod of the said cylinder projecting from both ends and having a rack $l^4$ at the rear end which engages with the pinion $f^6$ another hydraulic cylinder $m$ fixed to the cradle and having at one end a spring accumulator $p$ a ram $m^2$ having a valve head $m^3$, a movable piston valve seat $m^4$ in the cylinder, a spring $m^8$ for forcing the said seat against the valve head, an adjustable stop $o$ fixed to the carriage in the line with the ram $m^2$, a valve box $m^5$ fitted with valves $r$, $r'$ for distributing the liquid through pipes $n$, $n'$ to the cylinder $l$, a passage $m^7$ leading from the rear end of the cylinder $m$ to the valve box, a pipe $m^8$ forming an exhaust passage from the valves $r$ $r'$ to the forward end of the cylinder and a handle for operating the valves $r$ $r'$ the whole operating so that at the end of the recoil the ram $m^2$ is driven inward by the stop $o$, thus charging the accumulator with liquid under pressure which is used upon opening the valve $r$ for actuating the piston $l'$ and opening the breech and upon opening the valve $r'$ for returning the piston $l'$ and reclosing the breech, substantially as described.

In testimony whereof I have hereunto signed my name in the presence of two subscribing witnesses.

JEAN BAPTISTE GUSTAVE ADOLPHE CANET.

Witnesses:
ROBT. M. HOOPER,
J. CHATEL.